Feb. 11, 1958     H. A. BENZEL     2,822,817

FILLER VALVE

Filed June 8, 1956

INVENTOR
Howard A. Benzel
BY
Walter H. Popp.
ATTORNEY

2,822,817

FILLER VALVE

Howard A. Benzel, Lancaster, N. Y., assignor to Scott Aviation Corporation, Lancaster, N. Y., a corporation of New York Application June 8, 1956, Serial No. 590,146

1 Claim. (Cl. 137—223)

This invention relates to a check valve, and particularly to that type of spring-loaded check valve which is tubularly connected with a container used for holding compressed fluid, said filler valve being adapted to receive compressed fluid from a filling nozzle that is placed over the front or outer end of said filler valve and is tubularly connected to the distal end of a flexible hose which is supplied with fluid under pressure from a suitable source of fluid under pressure. More particularly, this invention relates to a filler valve for filling a portable tank with breathing fluid under pressure such as compressed air or compressed oxygen.

The main object of the invention is to provide a rugged and free-flowing filler valve in which the valve is so guided as to seat properly even after long service and hard abuse. Other collateral objects of the invention and practical solutions thereof are disclosed in the following description and illustrated in the accompanying drawing wherein.

Figure 1:
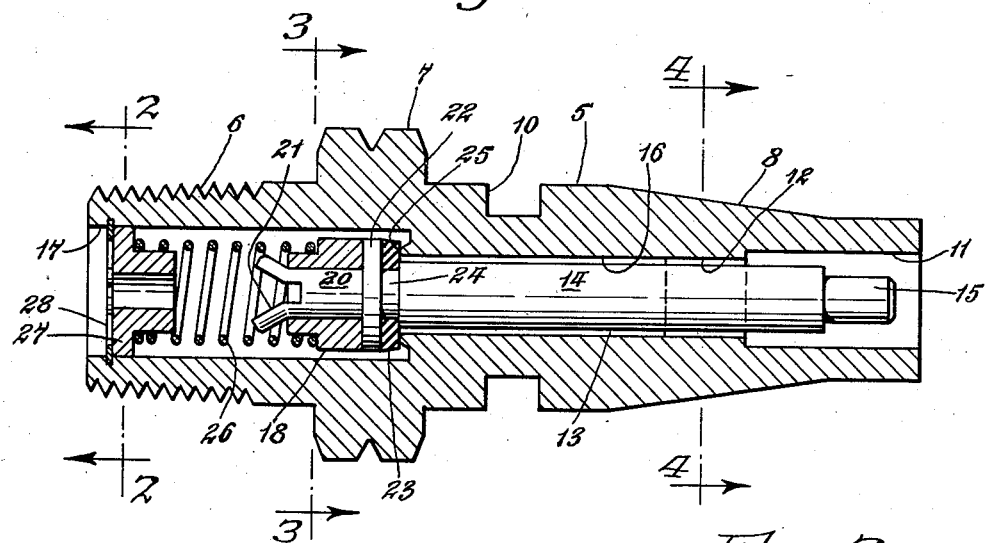
Fig. 1 is a medial, longitudinal section thru my improved filler valve.
Figure 2:
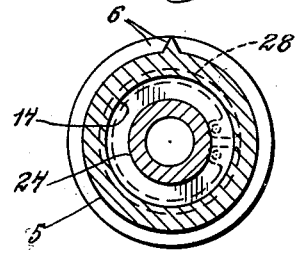
Figs. 2, 3 and 4 are vertical, transverse sections thereof taken on correspondingly numbered lines of Fig. 1.
Figure 3:
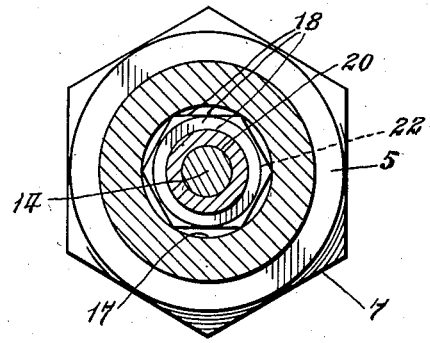
Figure 4:
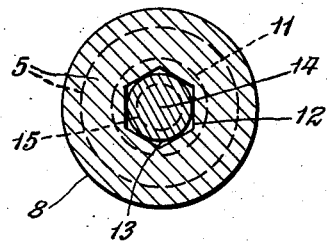

This invention will be described exactly as it is illustrated but it is to be understood that the scope of the invention is to be measured solely by the breadth of the appended claim and by the intrinsic novelty of the invention.

The valve casing 5 is of substantially tubular form and is provided at its extreme rear end with male threads 6 to enable it to be tubularly connected with whatever tank or other receptacle it is desired to fill with compressed breathing fluid (which we will assume is compressed air). The central part of said casing 5 is enlarged at 7 and has its periphery of this enlargement formed of hexagonal shape so as to permit said casing to be screwed into whatever pipe fitting or other fluid fitting or receptacle is to receive the compressed air. The front periphery of said casing 5 is tapered at 8 so as to engage (in the usual and well known, fluid-tight manner) with a compressed air nozzle (not shown). Rearwardly of said tapered portion 8 the periphery of said casing 5 is provided with the annular retaining groove 10 which is adapted to be engaged by the usual retaining latch of aforesaid nozzle.

The extreme front end of the casing 5 is bored out to a relatively large diameter to form an enlarged bore 11 which is adapted to receive the male portion of aforesaid nozzle. Rearwardly of said enlarged bore 11 the casing 5 is formed to provide a hexagonal or other flat-faced, guide hole 12. The latter is longitudinally relatively short so as to reduce the frictional resistance impeding longitudinal movement of the cylindrical shank 13 of the plunger 14. The latter is reduced in diameter at its front end to form the reduced head 15, the purpose of which is to firmly push inwardly the stem of aforesaid hose nozzle (not shown) but in such manner as to least impede the flow of compressed air from said nozzle into the filler valve which constitutes the present invention.

Rearwardly of the flat-faced, guide hole 12 the casing 5 is formed to provide a relatively long, cylindrical clearance bore 16 which has the merit that it forms an accurate guide for the broaching tool which is used to broach out the flat-sided, guide hole 12. Also, it prevents friction between the plunger 14 and the casing 5 along the entire length of aforesaid clearance bore 16.

The rear end of the casing 5 is bored out to a relatively large diameter to form a cylindrical guide bore 17 in which is slidingly arranged the hexagonal periphery of a flat-faced, guide head 18, the latter being bored out so as to be slipped over the rear end (during assembly) of an annular extension 20 which is formed integrally and coaxially at the rear end of the plunger 14. The guide head 18 is held in its assembled position by splitting (transversely milling) the rear end of said extension 20 at 21 and then, after slipping said guide head 18 in place, spreading the two arms of the split portion 21 apart as shown in Fig. 1.

Between the annular extension 20 and the cylindrical shank 13 of the plunger 14 the latter is provided with an integral collar 22 against the rear face of which is arranged aforesaid guide head 18. Against the front face of said collar 22 is arranged a washer-shaped, valve 23 which is constructed of rubber, silicone or other elastic material, and which, in assembly, is snapped into place into an annular, reduced neck 24 that is formed in the plunger 14 adjacent the front face of its collar 22. This valve 23 is preferably cemented in place on the plunger 14 and is adapted to engage with its front face the rear transverse face of an annular valve seat 25 which is formed in the casing 5 at the front end of the guide bore 17.

The rear end of the guide head 18 is reduced in diameter to be received within the front end of a helical compression spring 26 whose rear end encircles the forwardly-projecting, annular neck of a hollow stop 27. The periphery of the latter is received within aforesaid guide bore 17. Rearward displacement of said hollow stop 27 is prevented by an internal, retaining, C ring 28 whose periphery is received within a suitable counterbore at the rear end of the guide bore 17. The purpose of making this stop 27 hollow is, of course, to allow the compressed air to freely flow rearwardly thru its hollow bore.

This invention may appear at first glance to be extremely simple, but it constitutes a very vital essential part of any fluid apparatus which needs to be frequently charged with compressed fluid. Its very simplicity and the fact that its coordinated parts blend into each other so effectively is the reason that, while inexpensive to manufacture, it is extremely rugged and reliable as proved by actual practice under very adverse operating conditions.

I claim:

A filler valve comprising: a tubular casing having a flat-faced guide hole near its front end and a cylindrical guide bore near its rear end and a cylindrical clearance bore intermediate said guide hole and guide bore and having a valve seat at the rear end of said clearance bore; a plunger having a cylindrical shank at its front end and a reduced head disposed forwardly of said cylindrical shank and having an integral collar near its rear end and a reduced neck between said collar and said cylindrical shang and having an annular extension disposed rearwardly of said collar, the rear end of said extension being split; a flat-faced, guide head arranged on said extension; a washer-shaped valve arranged in said reduced neck against the front face of said collar; a hollow stop arranged in the rear end of said guide bore; and a compression spring arranged in said guide bore between the front face of said hollow stop and the rear face of said guide head.

(References on following page)

References Cited in the file of this patent

UNITED STATES PATENTS

| | | |
|---|---|---|
| 1,249,112 | Keister | Dec. 4, 1917 |
| 1,510,846 | Hofmann | Oct. 7, 1924 |
| 1,552,101 | Wiechmann | Sept. 1, 1925 |
| 1,713,889 | Criswell | May 21, 1929 |
| 2,055,601 | Dodge | Sept. 29, 1936 |
| 2,736,338 | Britton | Feb. 28, 1956 |

FOREIGN PATENTS

| | | |
|---|---|---|
| 745,754 | Great Britain | Feb. 29, 1956 |